US008354085B1

(12) United States Patent
Guelis

(10) Patent No.: US 8,354,085 B1
(45) Date of Patent: Jan. 15, 2013

(54) ACTINIDE AND LANTHANIDE SEPARATION PROCESS (ALSEP)

(75) Inventor: Artem V. Guelis, Naperville, IL (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 13/422,006

(22) Filed: Mar. 16, 2012

(51) Int. Cl.
*C22B 60/00* (2006.01)
(52) U.S. Cl. ............... 423/9; 423/10; 423/21.5
(58) Field of Classification Search ............... 423/9, 10, 423/21.5
See application file for complete search history.

(56) References Cited

U.S. PATENT DOCUMENTS

| 5,256,383 | A | * | 10/1993 | Cordier et al. | ............... | 423/9 |
| 5,708,958 | A | * | 1/1998 | Koma et al. | ............... | 423/8 |
| 2012/0152059 | A1 | * | 6/2012 | Heres et al. | ............... | 75/393 |
| 2012/0160061 | A1 | * | 6/2012 | Heres et al. | ............... | 75/393 |

FOREIGN PATENT DOCUMENTS

| FR | 2948384 | * | 1/2011 |
| FR | 2948385 | * | 1/2011 |

* cited by examiner

*Primary Examiner* — Steven Bos
(74) *Attorney, Agent, or Firm* — Bradley W. Smith; Brian J. Lally; John T. Lucas

(57) ABSTRACT

The process of the invention is the separation of minor actinides from lanthanides in a fluid mixture comprising, fission products, lanthanides, minor actinides, rare earth elements, nitric acid and water by addition of an organic chelating aid to the fluid; extracting the fluid with a solvent comprising a first extractant, a second extractant and an organic diluent to form an organic extractant stream and an aqueous raffinate. Scrubbing the organic stream with a dicarboxylic acid and a chelating agent to form a scrubber discharge. The scrubber discharge is stripped with a simple buffering agent and a second chelating agent in the pH range of 2.5 to 6.1 to produce actinide and lanthanide streams and spent organic diluents. The first extractant is selected from bis(2-ethylhexyl)hydrogen phosphate (HDEHP) and mono(2-ethylhexyl)2-ethylhexyl phosphonate (HEH(EHP)) and the second extractant is selected from N,N,N,N-tetra-2-ethylhexyl diglycol amide (TEHDGA) and N,N,N',N'-tetraoctyl-3-oxapentanediamide (TODGA).

19 Claims, 14 Drawing Sheets

ACTINIDE AND LANTHANIDE SEPARATION PROCESS (ALSEP)

CONTRACTUAL ORIGIN OF THE INVENTION

The United States Government has rights in this invention pursuant to Contract No. DE-AC02-06CH11357 between the U.S. Department of Energy and the UChicago Argonne, LLC, representing Argonne National Laboratory.

BACKGROUND OF THE INVENTION

1. Field of the Invention

This invention relates to an improved method of processing high level waste in order to separate the actinides and fission products, and more specifically, this invention relates to an improved method of reprocessing spent nuclear fuel providing improved separation of minor actinides from lanthanides on an industrial scale.

2. Background of the Invention

The recent renewed interest in nuclear power stems from higher petroleum costs and also petroleum role in carbon dioxide emissions. According to the Intergovernmental Panel on Climate Change (IPCC), total carbon emissions from the energy sector are expected to grow from today's 6.5 billion tons to 13 billion tons in 2050, with total cumulative emissions of carbon through 2050 of 440 billion tons.

The management of a nuclear system of a scope to even begin ameliorating this anticipated carbon load requires planning. For example, a worldwide capacity of 3500 GWe (a figure of illustrative convenience, ten times current capacity), if based on a once-through fuel cycle using light water reactors, would generate roughly 700 tons of plutonium annually, and would require on the order of one-half million tons of natural uranium annually. If based on liquid-metal plutonium breeder reactors, it would involve the fabrication into fresh fuel annually of over five thousand tons of plutonium. With the legacy of light water reactors in existence, the reprocessing of spent fuel from these reactors will be an ongoing concern for the foreseeable future.

The disposition of the waste which results from the reprocessing of irradiated nuclear power reactor fuel elements containing highly radioactive waste generated from reprocessing of spent nuclear fuel contains various elements which retain their toxicity over long periods of time is one of the major problems facing the nuclear power industry today. One approach is to solidify the liquid wasted as it come from there reprocessing facility into a stable solid material which can be stored in the earth for a period of time sufficient for the radiation to decay to sage levels. Alternatively, more toxic elements can be removed by appropriate process to remove the more toxic elements, leaving lower toxicity material which easier to store or treat. Elements such as transuranium elements (TRU), and the treatment and disposal of these elements present a problem. Of the transuranium elements, the minor actinides, americium (Am) and curium (Cm) have especially high toxicity, so it is desirable to remove them from radioactive waste and to deal with them appropriately. When using Am and Cm as fuel for their transmutation, Am, Cm and rare earth elements which chemically resemble each other, have to be separated. A number of separation processes have been developed to separate toxic fuel waste to permit more efficient handling and storage.

Ninety percent of the waste proposed for disposal at the geologic repositories generally consists of spent nuclear fuel, such as that generated by commercial nuclear power plants, government reactors, and naval propulsion plant reactors.

The remaining ten percent of wastes proposed for disposal at Yucca Mountain consists of high-level radioactive waste, which is produced mainly from spent nuclear fuel reprocessing, such as PUREX, discussed below. Storage of high level waste without any attempts at heat load and/or volume reduction can quickly deplete the space allowed for such waste.

Briefly, the PUREX process consists of a sequence of chemical process steps comprising initially treating the waste of scrap material or spent fuel containing uranium compounds with an aqueous solution of nitric acid ($HNO_3$), and thereby dissolving the uranium to produce uranyl nitrate ($UO_2 (NO_3)_2$), neptunium nitrate $NpO_2NO_3$ and plutonium nitrate $P_u (NO_3)_4$ (Fission Products, FP) and other acid soluble components within an aqueous phase. This aqueous phase containing the acid dissolved components including uranyl nitrate, and any acid insoluble components of the waste is passed down through an extraction column, pulsed columns or mixer-settlers while an organic phase of tri-butyl phosphate in an organic diluents of paraffinic oil, such as kerosene, is passed up through the extraction column in counter-current flow with the aqueous phase. The soluble uranium compounds comprising uranyl nitrate of the aqueous phase are extracted therefrom by the organic phase and combined with the tri-butyl phosphate. This separates the uranium and carries it within the organic phase from the extraction column. The aqueous phase and the organic phase each exit from the extraction column at opposite ends from each other and from their respective entries, the aqueous phase with the acid soluble raffinate contaminants and the organic phase with the separated uranium, neptunium and plutonium. The raffinate produced from the PUREX process contains, generally, Fission Products (FP-transition elements such as zirconium, molybdenum, technetium, including noble metals as ruthenium, rhodium, palladium, platinum, rear earth elements—lanthanum, cerium, praseodymium, neodymium promethium samarium, europium; and actinides-protactinium, americium (minor actinide), curium (minor actinide), and trace amounts of plutonium, uranium, gadolinium and terbium.

The organic phase effluent from the extraction column or the bank of centrifugal contactors carrying separated uranium compounds is then passed up through a stripping column while water is passed down through the stripping column in counter-current flow with the organic phase. The water releases the uranium from the tri-butyl phosphate of the organic phase whereby it is transferred to and carried within the aqueous phase. The aqueous phase and the organic phase each exit from the stripping column at opposite ends of the separator from each other and from their respective entries, the organic phase containing the uranium and plutonium compounds is treated to separate uranium and plutonium for recovery from the contaminants. The organic phase is then recycled back through the extraction column. Typically, the procedure is carried out with a continuous flow of all components through the system comprising the extraction column and stripping column.

The desired product of the PUREX solvent extraction process is a high purity aqueous phase effluent from the system containing virtually all the uranium of the initial waste fed into the system. However, some losses of uranium occur in the raffinate effluent by design and represent an economic loss. There is an acknowledged "trade-off" between the uranium product purity obtainable and the level of uranium loss in the raffinate. The extent of this balance of benefits depends substantially upon individual design. To enhance impurity reduction, some system designs include an intermediate scrub-section adjoining or as a section of the extraction column.

However, the PUREX process does not recover other components of the spent fuel rods such as americium, cesium, strontium, neptunium, and technetium. Thus, PUREX produces high-level waste primarily comprised of transuranic elements and fission products. Improvements on the PUREX process have been developed to correct the removal of selected elements. Similar processes, such as but not limited to, COEX, and AREVA processes, such as DIAMEX, treatment process produce a nitric acid based aqueous raffinate stream, similar to the PUREX raffinate. As discussed previously, it is desirable to separate minor actinides, in particular Am and Cm, from the lanthanides to minimize long term storage volume.

As part of the management of minor actinides it has been proposed that the lanthanides and trivalent minor actinides should be removed from the PUREX raffinate by a process such as TRUEX or DIAMEX. In order to allow the actinides such as americium to be either reused in industrial sources or used as fuel, the lanthanides must be removed. The lanthanides have large neutron cross sections and hence they would poison a neutron driven nuclear reaction. Other systems such as the dithiophosphinic acids are being worked on by some other workers.

One method of separating transuranium elements including trivalent actinides such as Am or Cm and nuclear fission products (FP) from highly radioactive waste, is the TRUEX (TRansUranic EXtraction) method. In the TRUEX method, octyl(phenyl)-N,N-di-isobutylcarbamoylmethylphosphine oxide (referred to hereafter as CMPO) and tributylphosphate (referred to hereafter as TBP) are mixed with a hydrocarbon diluent (e.g. n-dodecane) to make a solvent with which transuranium elements are extracted. This solvent will be referred to hereafter as a CMPO-TBP mixed solvent. The CMPO-TBP solvent is brought into contact with acidic radioactive waste to separate transuranium elements and nuclear fission products. According to the TRUEX method, transuranium elements including trivalent actinides such as Am and Clare extracted by the CMPO-TBP mixed solvent, leaving nuclear fission products in the aqueous phase.

However, rare earth elements in the nuclear fission products are also extracted together with transuranium elements by the CMPO-TBP solvent. Consequently, the method does not work well to separate trivalent actinides such as Am and Cm in the transuranium elements from rare earth elements.

The DIAMEX (DIAMideEXtraction) process has the advantage of avoiding the formation of organic waste which contains elements other than carbon, hydrogen, nitrogen and oxygen. Such an organic waste can be burned without the formation of acidic gases which could contribute to acid rain. The DIAMEX process is being worked on in Europe, primarily through the French nuclear program. The process is sufficiently mature that an industrial plant could be constructed with the existing knowledge of the process. In common with PUREX this process operates by a solvation mechanism.

The TALSPEAK (Trivalent Actinide Lanthanide Separation by Phosphorous reagent Extraction from Aqueous (K) Complexes) process uses an acidic organophosphorus reagent (HDEHP, di-2-ethylhexyl-phosphoric acid) and an aminopolyacetic type complexing agent (e.g. diethylenetriamine pentacetic acid) to separate trivalent actinides and rare earth elements. According to this TALSPEAK method, trivalent actinides and rare earth elements can be separated from each other with high efficiency. However, according to the aforesaid TALSPEAK method, a pH of approximately 3 must be maintained in the separating step in order to obtain suitable separation conditions.

The highly radioactive waste generated by reprocessing of spent nuclear fuel normally contains acid of approximately 3M concentration. It was therefore necessary to subject the highly acid waste to a denitrification step as a pretreatment to reduce its acidity before using the TALSPEAK method. It was also necessary to maintain the pH at 3 throughout the entire separation process, and normally, the pH had to be controlled by adding pH buffers such as highly concentrated carboxylic acids (e.g. lactic acid) to the stripping solution. It was difficult to adjust the pH precisely.

The UREX (URanium EXtraction) process is a modification of the PUREX process to prevent the plutonium from being extracted. This can be done by adding a plutonium reductant before the first metal extraction step. In the UREX process, ~99.9% of the uranium and >95% of technetium are separated from each other and the other fission products and actinides. The key is the addition of acetohydroxamic acid (AHA) to the extraction and scrub sections of the process. The addition of AHA greatly diminishes the extractability of plutonium and neptunium, providing greater proliferation resistance than with the plutonium extraction stage of the PUREX process. Additional modifications of the UREX were developed to improve the separation of specific elements. UREX produces an intermediate raffinate stream of similar composition to the PUREX raffinate stream.

A separation factor (SF) may be defined which measure the process capability to separate elements; the higher the separation factor rating for a given set of element the more capable the process in separating the components. The factor is calculated from the ratio of elements, such as Europium Eu and Americium Am. TALSPEAK are rated in the order of a Eu/Am separation factor of from about 50 to about 100.

The process columns are typically agitated by either pulse pumps or reciprocating plates to permit optimal droplet formation and coalescence on each plate. This agitation is most commonly referred to as mixing energy. Mixing energy is critical to efficiency of the extraction column and helps establish a characteristic uranium profile. Excessive mixing energy or flow rates can cause flooding, a condition which precludes flow of one or both liquid operating mode phases in the column. The term flooding refers to a condition in which the two immiscible phases flow countercurrent past each other with a relative velocity that is sufficient to impede the steady flow of one phase or the other phase. In the PUREX process the bulk of the impurity removal or decontamination of uranium compounds is achieved near the inlet of the extraction column for feeding the acid treated waste material. The most efficient operation of the extraction column is substantially at the level of flooding which produces the maximum removal.

When the extraction column is operating at a steady state, a uranium concentration profile therein can be obtained by sampling either the organic or aqueous phase at several points along the vertical length of the column. The profile depends on the degree of trade off chosen between uranium product purity and level of uranium loss.

U.S. Pat. No. 5,708,958 awarded to Koma, et al. on Jan. 13, 1998 discloses a method is provided for separating trivalent actinides and rare earth elements in the TRUEX method using a CMPO-TBP mixed solvent. The method of separating trivalent actinides and rare earth elements comprises a trivalent actinide/rare earth extraction step wherein trivalent actinides and rare earth elements are extracted by a solvent from highly acid waste generated by reprocessing of spent nuclear fuel, a nitric acid removal step wherein the nitric acid concentration of the solvent used to extract the trivalent actinides and rare earth elements is reduced, and a separation step wherein the trivalent actinides and rare earth elements contained in the solvent of low nitric acid concentration, are separated from each other. U.S. Pat. No. 5,256,383 awarded to Cordier, et al. on Oct. 26, 1993 discloses a process for the separation of actinides from lanthanides by the selective extraction of the actinides in an organic solvent incorporating a propane diamide. This process consists of adding to the aqueous nitric solution containing the actinides and lanthanides a thiocyanate, e.g. ammonium thiocyanate, followed by the contacting of said solution with an organic solvent incorporating at least one propane diamide, e.g. 2-tetradecyl-N,N'-dimethyl-N,N'-dibutyl-propane diamide and optionally a quaternary ammonium salt such as trilauryl methyl ammonium (TMA) thiocyanate or a mixture of quaternary ammonium thiocyanates. This leads to distribution coefficients $D_M$ for the actinides (Am) and the lanthanides (Eu, Ce) making it possible to achieve high actinide/lanthanide separation factors.

None of the aforementioned patents or articles discloses a method which can achieve the objectives of high separation efficiency in separating minor actinides from lanthanides while minimizing process steps. Also, none of the aforementioned patents or articles discloses a method to produce feed streams suitable for detailed processing of spent nuclear fuels so as to separate transuranics and lanthanides.

A need exists in the art for spent fuel reprocessing system that minimizes the number of processes steps. The processing method should provide for the separation of actinides and lanthanides so the actinides can be used as nuclear fuels. The process should further result in a significant reduction in heat, radiotoxicity, or volume of high level waste. The process should minimize the use of separation problems/iteration effects brought about by the use of CMPO produce feeds suitable for nuclear fuel and/or targets for transmutation of transuranic elements.

SUMMARY OF INVENTION

An object of the invention is to provide a process for the separation of americium and curium (minor actinides) from lanthanide in the raffinate (aqueous) stream of the PUREX nuclear waste fuel processing stream or process producing a similar stream. A feature of the invention is the use of extractants that preferential attach to minor actinides in an aqueous system containing Am, Cm, fission products and lanthanides and trace amounts of U, Pu, NP. An advantage of the invention is the use of extractants with respect to minor actinides in an actinide/lanthanide aqueous solution.

Another object of the invention is to provide a separation process for nitric acid/aqueous mixtures containing nuclear waste fuel depleted of uranium and plutonium. A feature of the invention permits the separation of actinides from lanthanides in uranium and plutonium depleted stream containing nitric acid solvent. An advantage of the invention is it permits the separation of lanthanides from actinides from multiple nitric acid feed streams.

Briefly, the invention provides a process for separating minor actinides from reprocessing of a spent nuclear fuel process stream by providing a fluid mixture comprising, a trace amount of fission products, lanthanides, minor actinides, rare earth elements, nitric acid and water; adding at least one first organic complexing agent to the fluid mixture. Then extracting the fluid mixture with a solvent comprising a mixture a first extractant, a second extractant and an organic diluent to form a first organic extractant stream and a first aqueous raffinate comprising fission products. Then, performing at least a first scrubbing step on the first organic extractant stream with a mixture of dicarboxylic acid and a first chelating agent to form a first scrubber discharge. Stripping the first scrubber discharge with a simple buffering agent and a second chelating agent in the pH range of from about 2.5 to about 6.1 to produce an actinide and lanthanide stream and a spent organic diluents. Where the first extractant is selected from the group consisting of bis(2-ethylhexyl)hydrogen phosphate (HDEHP) and mono(2-ethylhexyl)-2-ethylhexyl phosphonate (HEH(EHP)) and the second extractant is selected from the group consisting of N,N,N,N-tetra-2-ethylhexyl diglycol amide (TEHDGA) and N,N,N',N'-tetraoctyl-3-oxapentanediamide (TODGA). As used herein, trace amounts of components, such as U, Pu and Np refers to a quantity of the component that is less that 0.5 wt. percent and preferably, less that 0.25 wt. percent.

In one embodiment of the invention, the minor actinides are selected from the group consisting of americium and curium. In an embodiment of the invention, the process further comprises a second scrubbing step on the first scrubber discharge with a carboxylic acid. In another embodiment of the invention, the process further comprises a second stripping step wherein the pH is adjusted from about 4.5 to about 5.5. In an embodiment of the invention, the first stripping step is performed at a pH range of from about 2.5 to about 4.5 and provides a first product stream comprising minor actinides and the second stripping step is performed at a pH of from about 4.5 to about 5.5 to provide a second stream comprising lanthanides. In an embodiment of the invention, the concentration of TEHDGA is from about 0.5 mM to about 200 mM. In an embodiment of the invention, the first chelating agent in N-hydroxyethyl-ethylenediamine-triacetic acid (HEDTA). In an embodiment of the invention, the dicarboxylic acid is oxalic acid. In an embodiment of the invention, the fission products are selected from the group consisting of uranium, plutonium and neptunium. In an embodiment of the invention, the second chelating agent is diethylene triamine pentaacetic acid (DTPA). In an embodiment of the invention, the actinides are stripped at a DTPA concentration of from about 1 mM to about 100 mM. In an embodiment of the invention, the carboxylic acid is selected from the group consisting of formic acid, lactic acid and citric acid. In an embodiment of the invention, the buffer is a mixture of ammonia and the salt of a carboxylic acid selected from the group consisting of citrate and lactate. In an embodiment of the invention, the second chelating agent is DTPA. In an embodiment of the invention, the second chelating agent is DTPA and the buffer is ammonia citrate. In an embodiment of the invention, the first strip solution is a mixture of 50 mMDTPa and 0.5 M ammonia citrate buffer and the second strip solution is a mixture of 100 mM DTPA and 0.5M ammonium citrate. In an embodiment of the invention the first extractant is mono (2-ethylhexyl) 2-ethylhexyl phosphonate (HEH(EHP)) and the second extractant is N,N,N,N-tetra-2-ethylhexyl diglycol amide (TEHDGA). In another embodiment of the invention the first extractant is mono(2-ethylhexyl)-2-ethylhexyl phosphonate (HEH(EHP)) and the second extractant is N,N,N',N'-tetraoctyl-3-oxapentanediamide (TODGA).

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
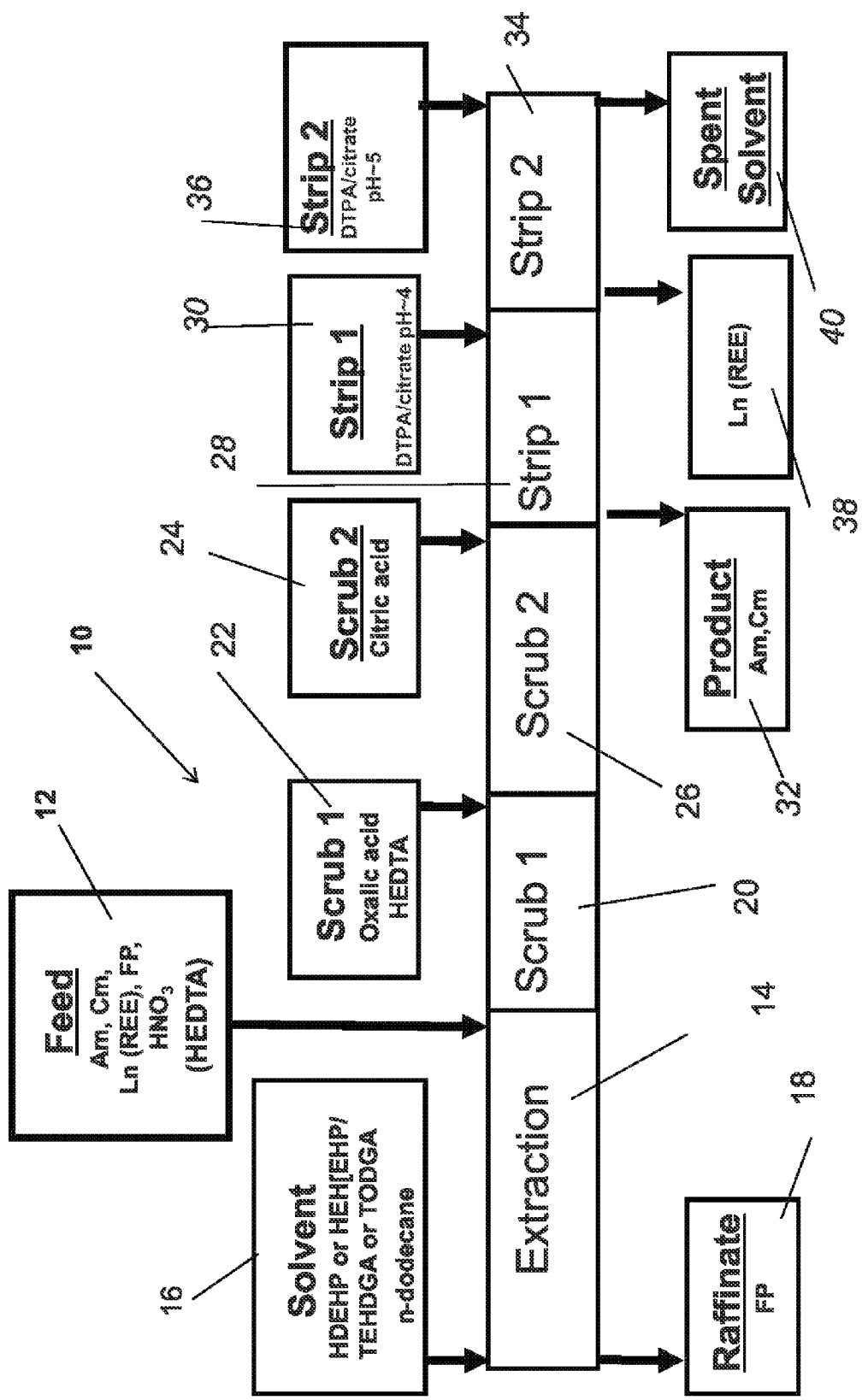
FIG. 1 is a diagram of the ALSEP process.

The invention is directed to a process for improved separation of minor actinides from lanthanides in the aqueous raffinate stream from the PUREX process for treated spent nuclear fuel, the process of the invention comprises the process as shown generally in FIG. 1 at 10. The process of the invention can also be used to treat similar aqueous raffinates from processes, such as, but not limited to CoEx and UREX. The process receives a feed stream, the aqueous raffinate stream from the PUREX process, comprising fission products (FP), minor actinides (MA, americium and curium), and lanthanides including rare earth elements (Y, La, Ce, Pr, Nd, Pm, Sm, Eu, Gd, Tb, Dy, Ho, Er, Tm, Yb, and Lu) in a nitric acid solution as shown at 12. The fission products comprise, but not limited to rubidium, strontium, yttrium, zirconium, niobium, technetium, ruthenium, rhodium, palladium, silver, cadmium, indium, tin, antimony, tellurium, iodine and their isotopes. Trace amounts of uranium, plutonium and neptunium may be present with the fission products. The aqueous feed stream 12 is introduced into the extraction Region 14 and a solvent stream 16 comprising a mixture of a first extractant bis(2-ethylhexyl)hydrogen phosphate (HDEHP) or mono(2-ethylhexyl)-2-ethylhexyl phosphonate (HEH(EHP)), and a second extractant, N,N,N,N-tetra-2-ethylhexyl diglycol amide (TEHDGA) or N,N,N',N'-tetraoctyl-3-oxapentanediamide (TODGA) and n-dodecane diluents is introduced into the extraction region. Hydroxyethyl Ethylenediamine Triacetic Acid (HEDTA) may be added to the feed stream 12. In one embodiment of the invention, HEDTA is added to the feed stream while the feed liquid is stored in a tank or vessel. In another embodiment, HEDTA is added to the feed stream 12 prior to introduction into the extraction region 14. In an embodiment of the invention oxalic acid, a dicarboxylic acid, is added with HEDTA to the feed stream while in a storage tank or prior to introduction to the extraction region 14. In an embodiment the dodecane diluents is kerosene. The aqueous raffinate stream 18 containing fission products is discharged for further treatment, such as evaporation, consolidation and later disposal as a low level waste. As used herein, trace amounts of components, such as U, Pu and Np refers to a quantity of the component that is less that 0.5 wt. percent and preferably, less that 0.25 wt. percent.

The Extractant from the extraction region 14 discharge is fed to a first scrubber region 20 where it mixes with a first scrubbing agent 22 comprising a mixture of a dicarboxylic acid and a complexing/chelating agent that removes from the solvent unwanted species (primarily non-lanthanide fission products and non-radio-active reagents. In an embodiment of the invention, the dicarboxylic acid is oxalic acid $(H_2C_2O_4)$ and the complexing/chelating agent is (N-(hydroxyethyl)-ethylenediaminetriacetic acid) (HEDTA). In an embodiment of the invention, the loaded solvent is further contacted by a second aqueous solution containing the same complexant and buffer reagent in a second scrubbing agent 24, in a second scrubbing region 26. In one embodiment the solution in Scrub II is a carboxylic acid, such as formic acid, lactic acid or a complex carboxylic, such as citric acid. A first Strip step 28 with a first strip agent 30, such as citrate, producing a Product 32 of minor actinides Americium and Curium. A second Strip step 34 using a second Stripping agent 36 generates a Lanthanide product 38 stream comprising lanthanides and rare earth elements and a Spent Solvent stream 40 step. In an embodiment, the first strip agent 30 comprises Pentetic acid or diethylene triamine pentaacetic acid (DTPA) and citrate adjusted to a pH of from about 3.8 to about 4.2. In an embodiment on the invention, the Second Strip agent 36 comprises Pentetic acid or diethylene triamine pentaacetic acid (DTPA) and citrate adjusted to a pH of from about 4.0 to about 6. In another embodiment of the invention, the Second Strip agent 36 comprising pentetic acids (DTPA) and citrate, adjusted to a pH of from about 4.8 to 5.2.

Figure 2:
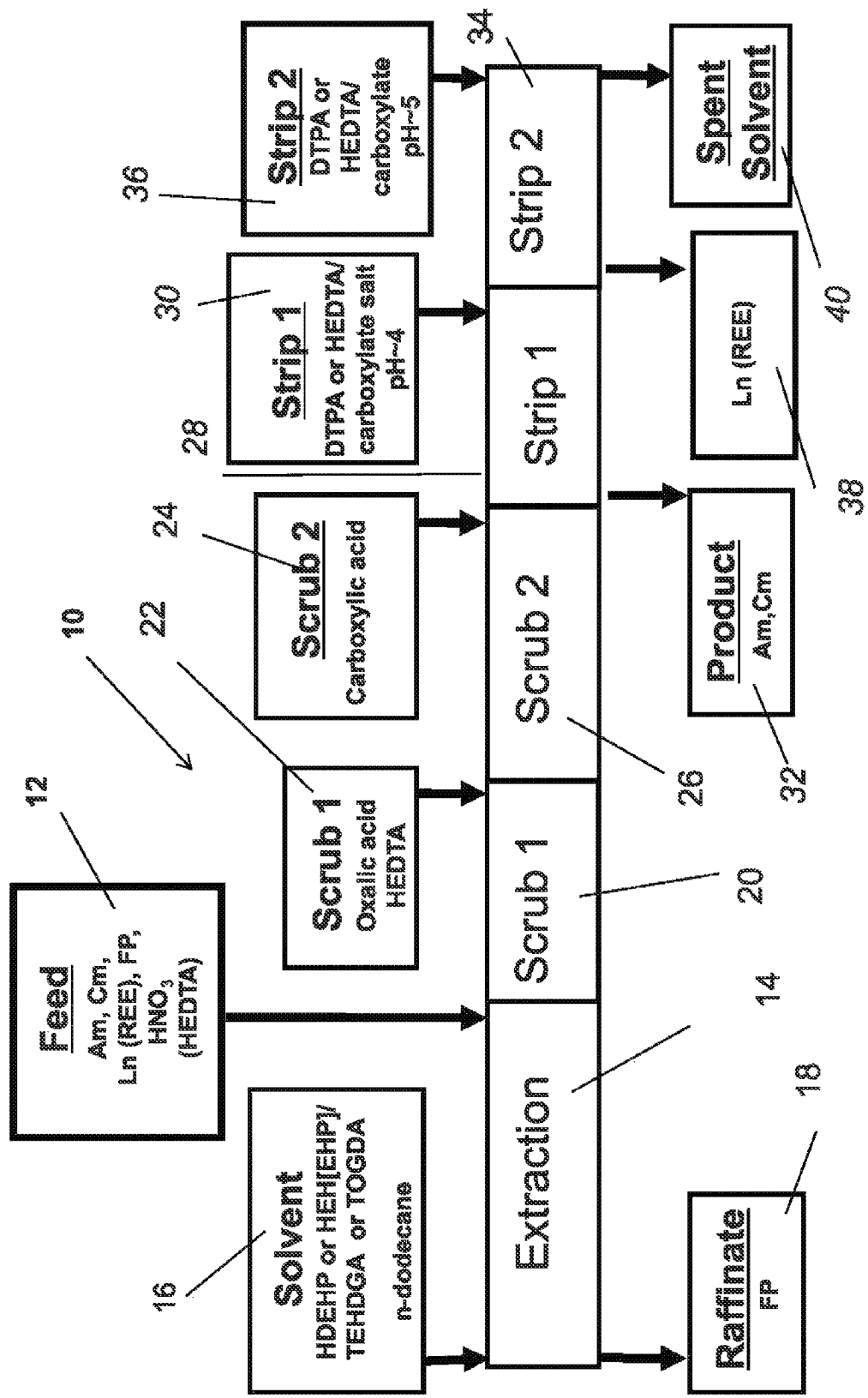
FIG. 2 is a diagram of an alternate ALSEP process.

In an alternate embodiment, as shown in FIG. 2, the second Scrub step 26 and second Scrubing agent 24 may be selected from a carboxylic acid, such as citric acid, lactic acid or formic acid. Further, the first strip step 28 and first strip agent 30 may be a modified carboxylic salt that is compatible with the second Scrubbing agent. For example a lactate-based stripping agent can be used with a lactic acid scrubbing agent. Alternately, a formic-based stripping agent can be used with a formic acid scrubbing agent.

Figure 3:
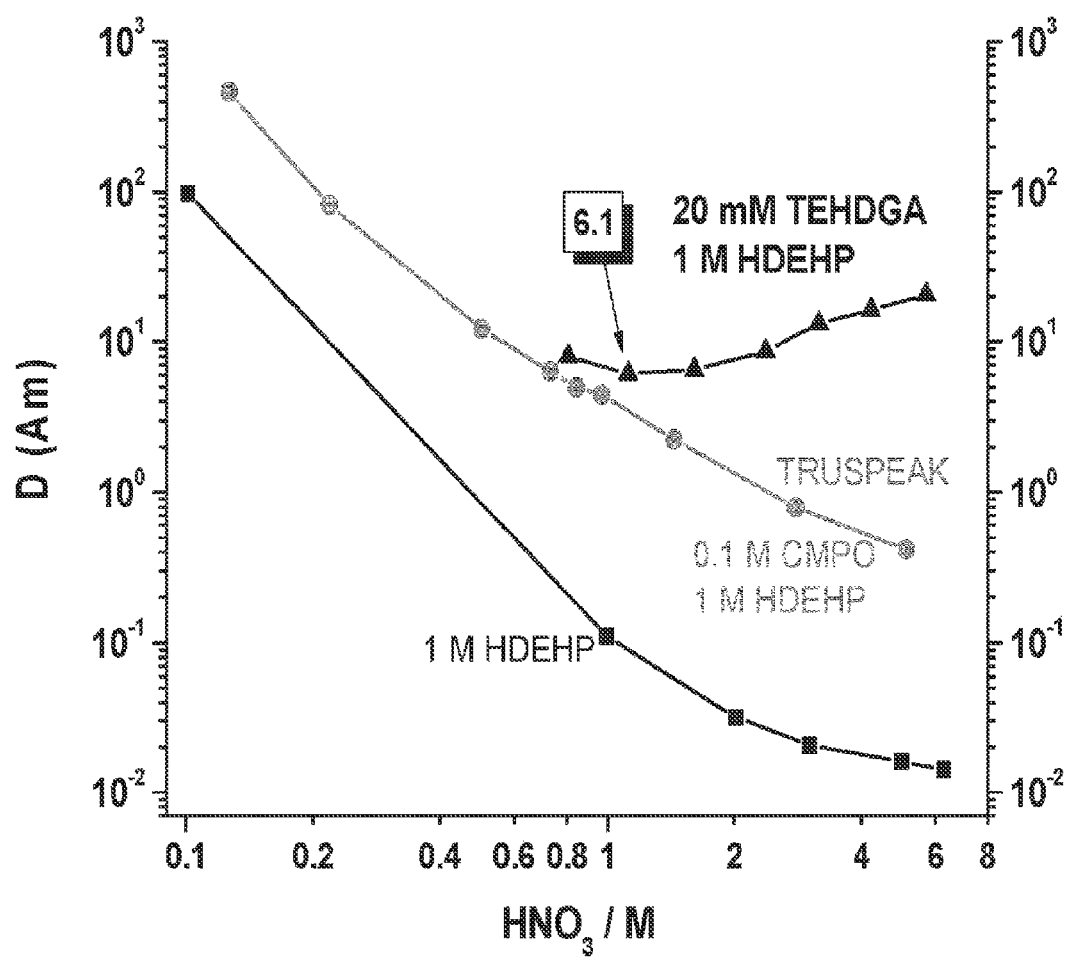
FIG. 3 is a graph of the Distribution ratio for Americium verses nitric acid molarity for HDEHP, CMPO/HDEHP system and TEHDGA/HDEHP system.
Figure 4:
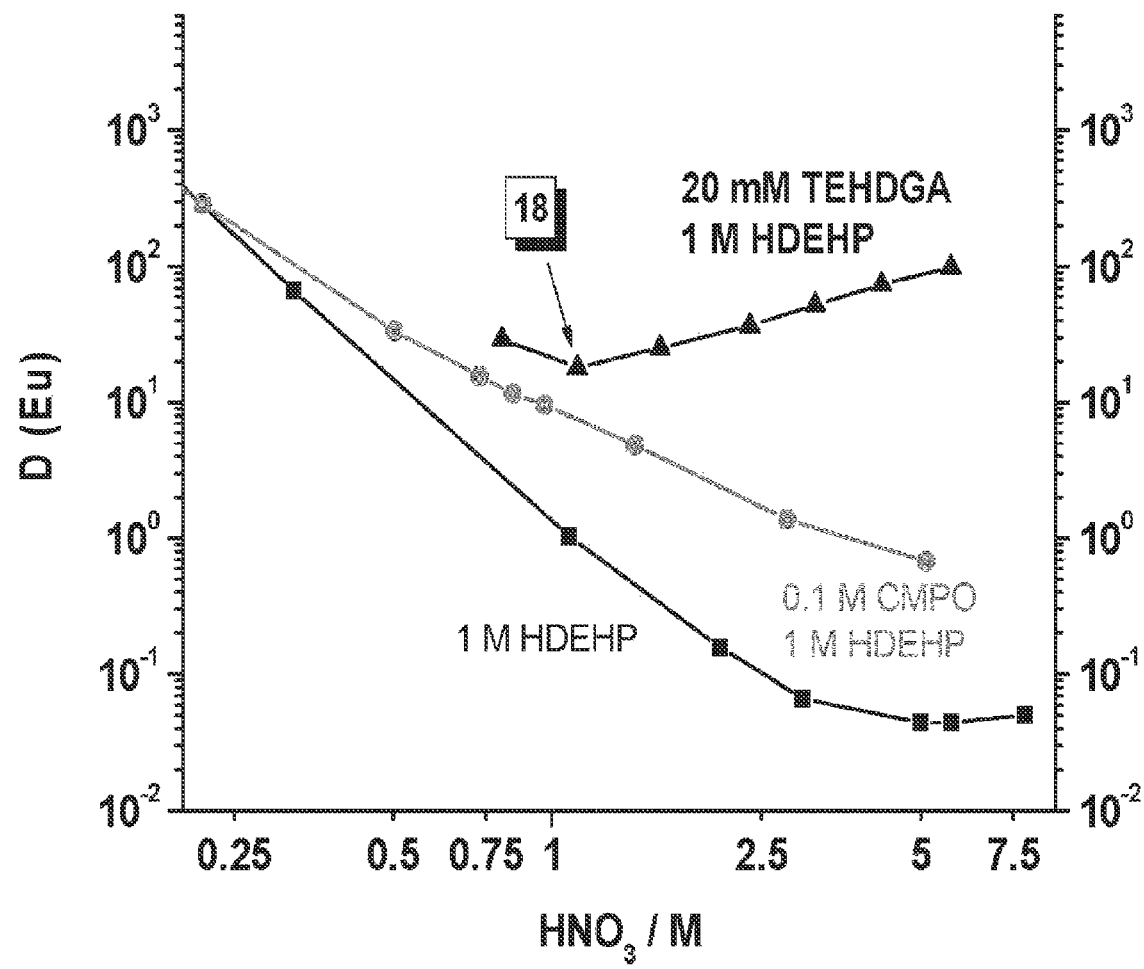
FIG. 4 is a graph of the Distribution ratio for Europium verses nitric acid molarity for HDEHP, CMPO/HDEHP system and TEHDGA/HDEHP system

The inventor has discovered a separation process using a unique combination of extractants resulting in improved separation of minor actinides, Am and Cm from PUREX raffinate under typical operating conditions. The combination of TEHDGA with HDEHP, as shown in FIG. 3 provides improved Distribution ratio (Calculated as Concentration of Am in organic/Concentration of Am in the aqueous phase) over a wide range of nitric acid inverse molarity. As shown in FIG. 3 the Distribution ratio (D value) for americium decreases from approximately 0.1 to 0.0100 for an inverse molarity range of 1 to 6. Under typical operating conditions PUREX raffinate is between from about 2 to about 4 $HNO_3$/M. Over this operating range of nitric acid concentration the D value for americium in 1M HDEHP decreases from about 0.03 to about 0.01. Over the same nitric acid molarities, for a typical TRUSPEAK extractant 0.1M CMPO and 1MHDEHP the D value for americium decreases from about 2.0 to about 0.5, while the D value with an extractant mixture of 1M HDEHP and 20 mM TEHDGA increases from about 10 to about 25. This indicates a high concentration of Am in the organic phase for the range of nitric acid concentration normally present in the PUREX raffinate. A similar favorable Distribution ratio is shown in FIG. 4 for Europium. As shown in FIG. 4 the Distribution ratio for Americium increases from approximately 15 to about 60 for an inverse molarity range of 2 to 4 over which the typical PUREX process operates. This is significantly better than the decreasing D values of 0.2 to 0.06 over a similar nitric acid molarity for 1M HDEHP extractant and decreasing D values from about 6 to about 1 for a 0.1 M CMPO 1M HDEPH extract mixture. This indicates a very strong concentration of Eu and Am in the organic phase over the typical nitric acid range for the PUREX raffinate.

A Distribution ratio greater than 1 (D>1) indicates that the component ratio (Calculated as Concentration of component in organic/Concentration of component in the aqueous phase) indicates that the component concentrates in the organic phase. In like manner a D value less than 1 (D<1) indicates that the component concentrates in the aqueous phase.

Figure 5:
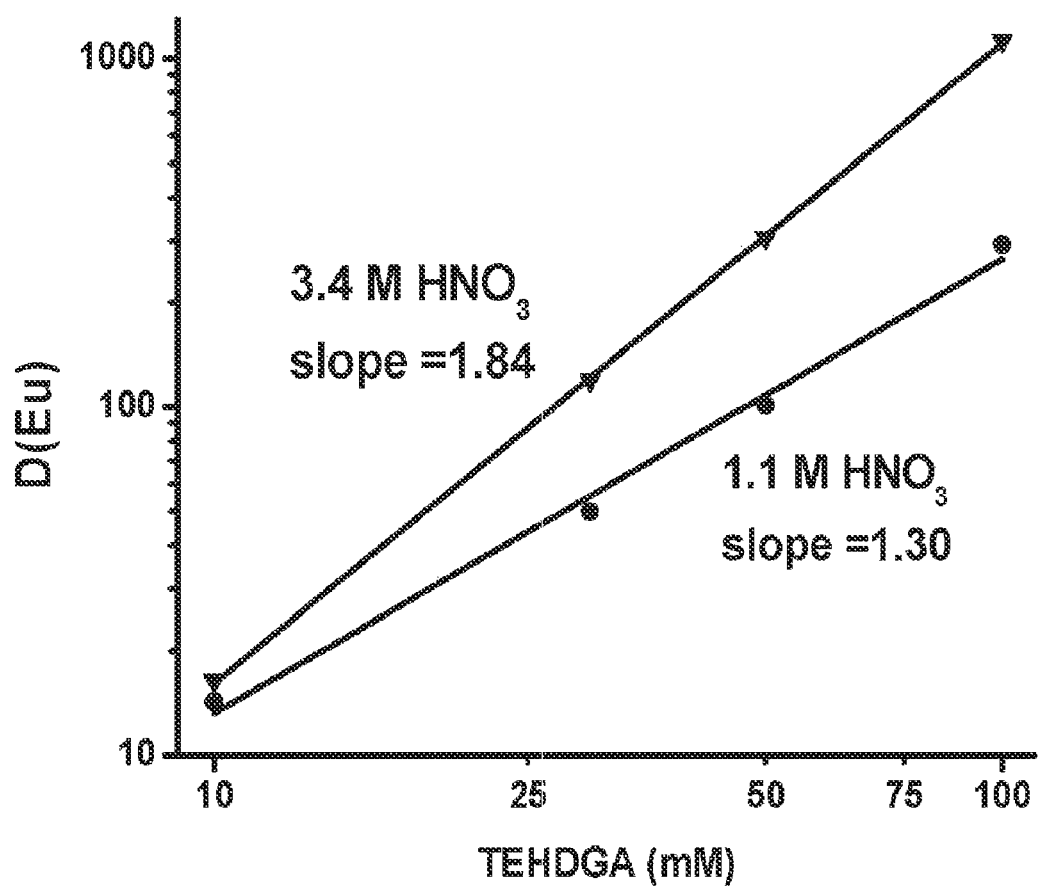
FIG. 5 is a graph of the Distribution ratio for Europium verses TEHDGA mM nitric acid molarity.

As illustrated in FIG. 5, the Distribution ratio for Eu increases proportionately with TEHDGA mM concentration, indicating a strong correlation between TEHDGA concentration and separation of Eu in the organic phase verses the aqueous phase. Extraction mechanism by TEHDGA/HDEHP mixture depends on $HNO_3$ concentration and correlates strongly with TEHDGA concentration and nitric acid concentration.

Figure 6:
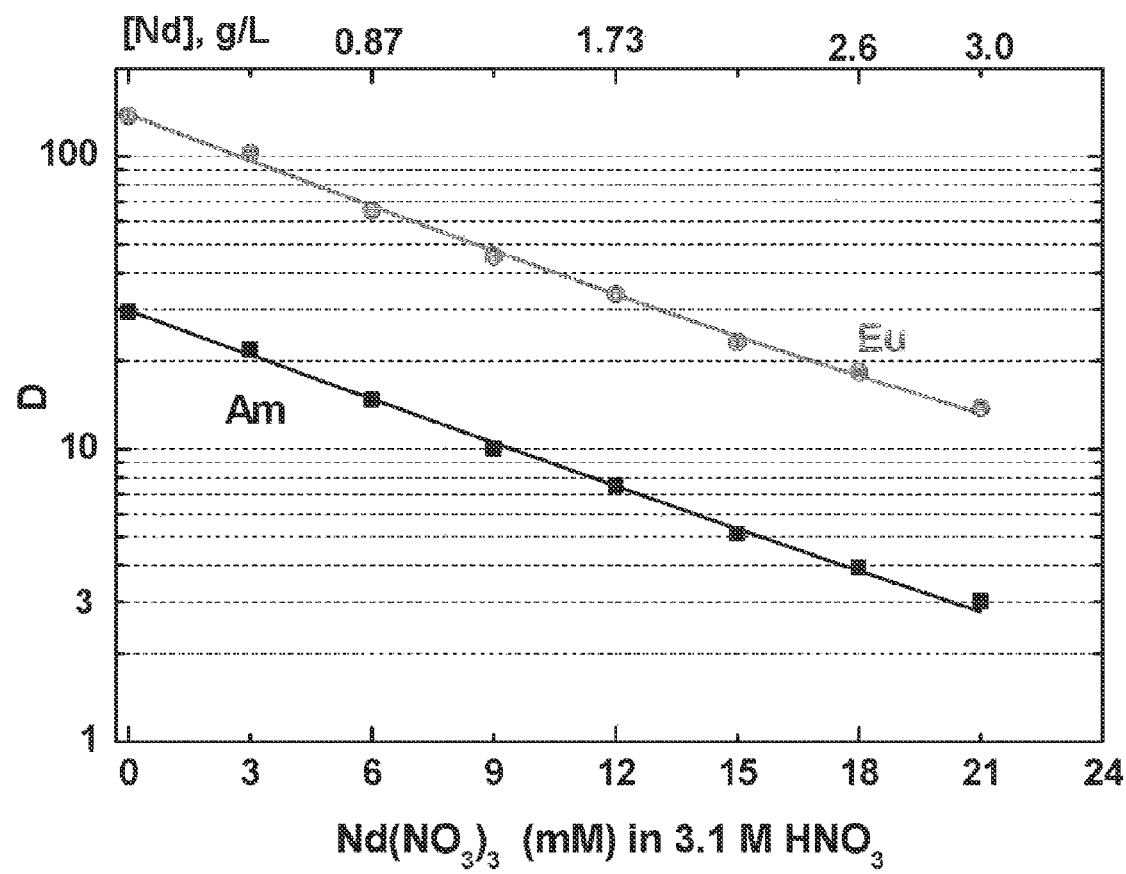
FIG. 6 is a graph of the Distribution ratio for Americium and Europium verses Neodymium nitrate mM in 3.1 M nitric acid with 30 mM TEHDGA, 1M HDEHP and 3.1M nitric acid.

The Distribution ratio of Am and Eu is influenced by the presence of Neodymium concentration in 3.1 M nitric acid, as shown in FIG. 6 {pg 7 rt}. However, the Distribution ratio is still significantly high to provide efficient separation of Am and Eu in the presence of neodymium. Americium can be extracted even at 21 mM Nd $(NO_3)_3$ in 3 M $HNO_3$. No third phase observed for any TEHDGA concentration in 1 M HDEHP/ddn HDEHP works as a phase modifier.

Figure 7:
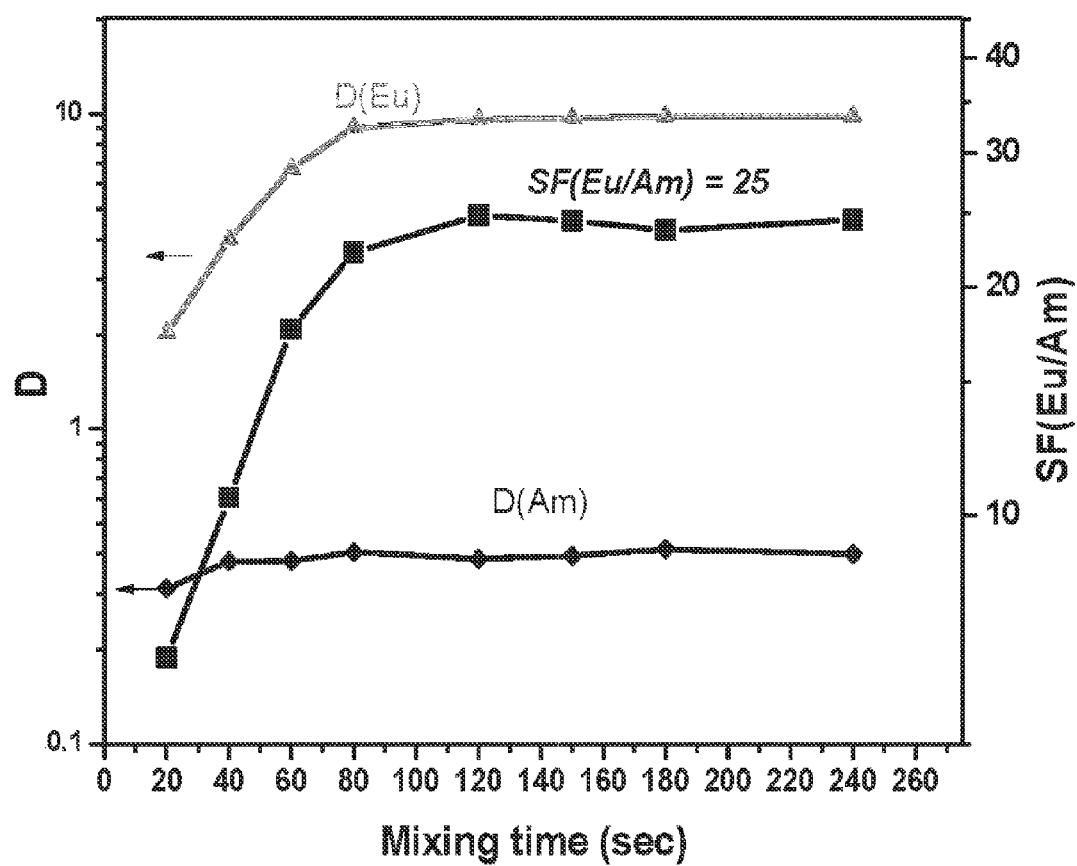
FIG. 7 is a graph of the Distribution ratio (concentration organic/concentration aqueous) verses Mixing time for Europium (Eu) and Americium (Am) and the Separation Factor for Europium/Americium in 30 mM TEHDGA/1M HDEP; 50 mM DTPA/1 M $(NH_4/H)_3$ Citrate at pH=3.61 (Forward Extraction kinetics)
Figure 8:
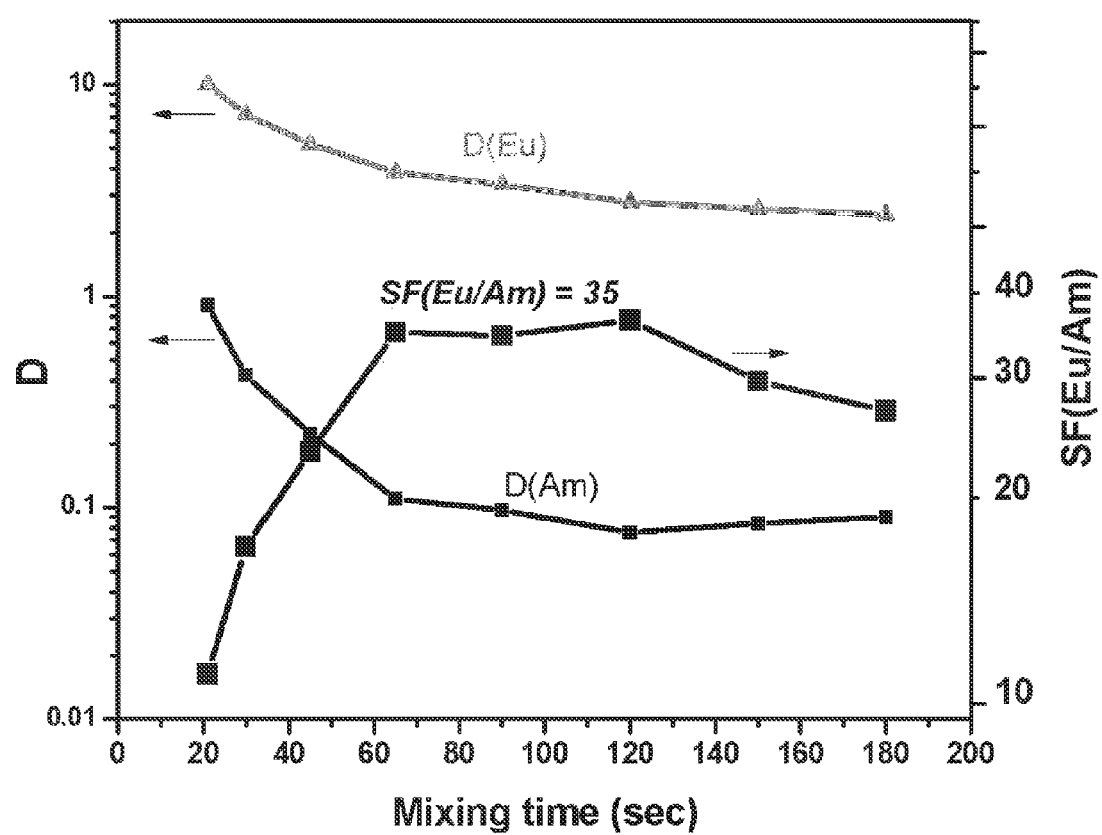
FIG. 8 is a graph of the Distribution ratio verses Mixing time for Europium (Eu) and Americium (Am) and the Separation Factor for Europium/Americium in 30 mM TEHDGA/ 1M HDEP; 50 mM DTPA/0.5 M $(NH_4/H)_3$ Citrate at pH=3.99 (Back Extraction kinetics)

As shown in FIG. 7, the Distribution factor and Separation Factor (SF) stabilize within a short time (approximately 2 minutes) of mixing for a 30 mM TEHDGA/1M HDEHP system with 50 mM DTPA/1M ($NH_4$/H) Citrate at a pH of 3.61. The Distribution ratio favors the concentration of the lanthanide, Europium, in the organic phase, while the Americium concentration is favored in the aqueous phase remains low in the organic phase. The Separation Factor (SF), the ratio of the Distribution ratio D for Eu/Am (D(Eu)ID(Am)) is approximately 25 times for Eu compared to Am at a ph of 3.61, thereby favoring the Eu concentration in the organic phase and the concentration of Am in the aqueous phase. A similar situation is shown in FIG. 8 for the back-extraction kinetics: 30 mM TEHDGA/1M HDEHP; 50 mM DTPA/0.5M ($NH_4$/H)$_3$ Citrate; pH=3.99. As with FIG. 7, the SF for Eu/Am stabilizes between 28 and 35 after the mixing process has stabilized. Comparison of FIG. 7 and FIG. 8 illustrates that the significant change in the D and SF with a slight increase in pH. An increase of approximately 0.4 pH units results in a difference in the Distribution ratio of approximately 200 (20/0.1) for Eu/Am and an increase in the SF from 25 to approximately 35, thereby providing a significant increase in separation efficiency.

Figure 9:
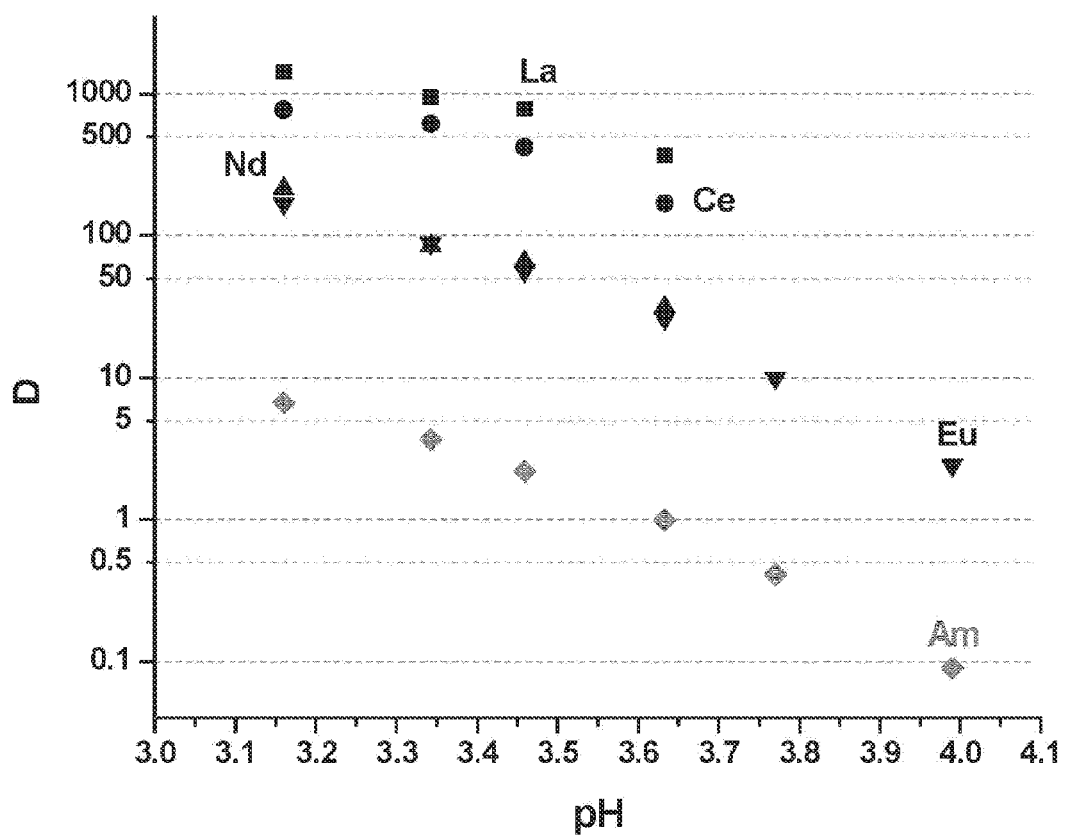
FIG. 9 is a graph of the Distribution ratio verses pH for Lanthanum, Cerium, Neodymium, Europium and Americium in 30 mM TEHDGA/1M HDEHP –50 mM DTPA/0.5 M $(NH_4/H)_3$ Citrate.

Sequential steps, in which the pH of the process is increased by the addition of more alkaline pH buffers solutions, permits increased efficiency in the separation of actinides from lanthanides. As illustrated with FIGS. 7 and 8, an increase in pH favors a higher concentration of Eu, a lanthanide, in the organic phase; while Am, an actinide, concentrates in the aqueous phase. A first strip step at a lower ph, i.e. from about 3.2 to about 4.0, would concentrate the lanthanide in the organic phase, while actinide would concentrate in the aqueous phase. A subsequent stripping step by DTPA/Citrate buffer at pH between 4 and 6 of the actinide depleted organic phase would produce an aqueous phase with almost pure lanthanide and a spent solvent. The spent solvent could be reused or reprocessed This trend is shown to be consistent for lanthanides verses actinides in general. As shown by FIG. 9, the inventor has found that D for ND/Am and Eu/Am are consistent over a wide pH range for 30 mM TEHDGA/1M HDEHP −50 mM DTPA/0.5M ($NH_4$/H)$_3$ Citrate extractant. Further, the lanthanides, in particular neodymium and europium effectively have the same rate of decline in D values over the pH range from about 3 to about 4. The SF for lanthanides/Am is approximately 30 over the pH range shown in FIG. 9. At a pH>≈3.62, D(Am)<1; therefore americium concentrates in the aqueous phase. Therefore, at a pH>3.62, americium concentrates in the aqueous phase while providing significant separation/concentration of lanthanides in the organic phase.

Figure 10:
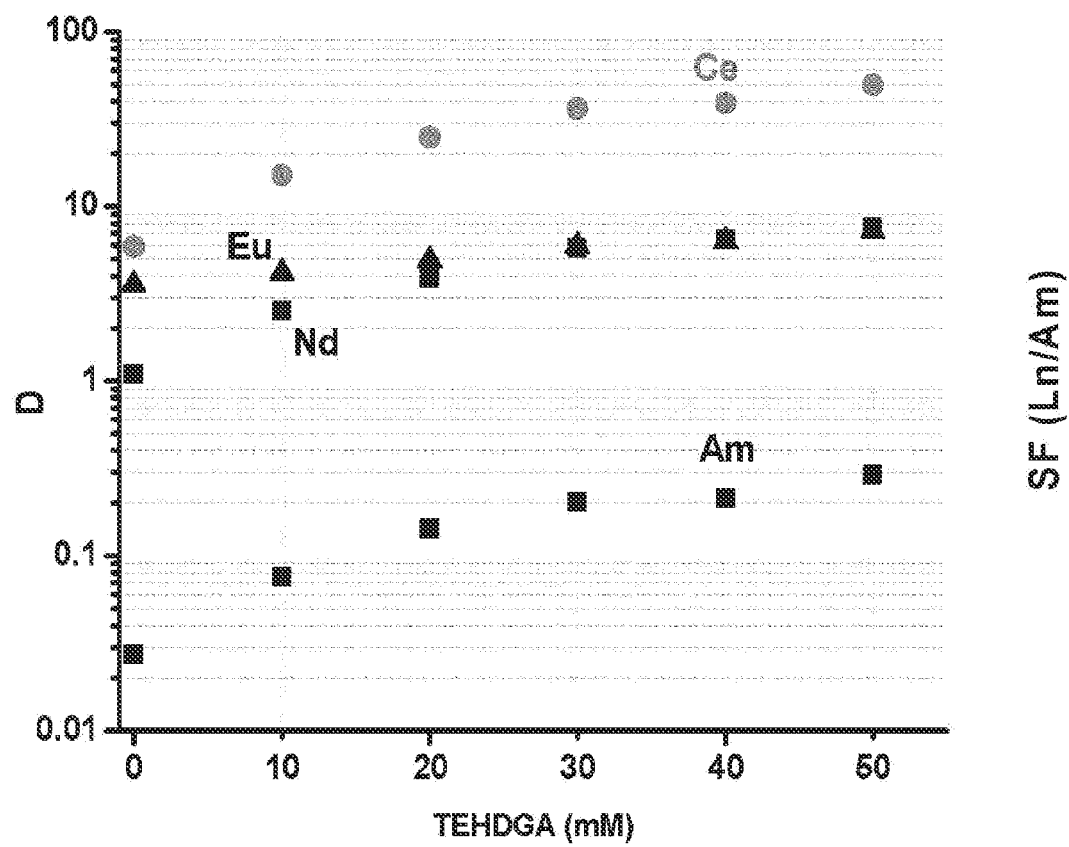
FIG. 10 is a graph of the Distribution ratio verses mM TEHDGA concentration for Cerium, Europium, Neodymium and Americium.
Figure 11:
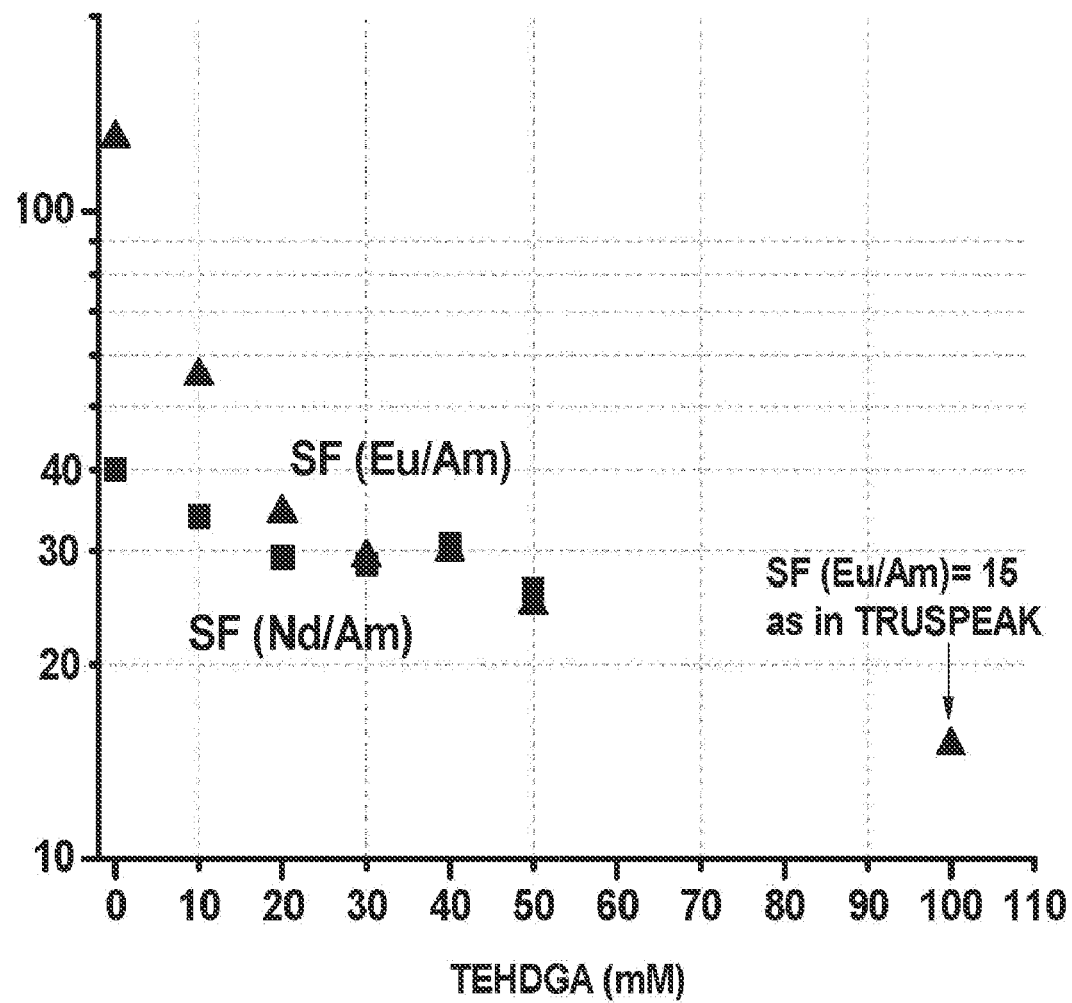
FIG. 11 is a graph of the Separation Factor SF for Lanthanides verses mM TEHDGA concentration for Europium and Neodymium compared to SF of Eu/Am in the TRUS-PEAK process.

As shown in FIG. 10, the Distribution Factor increases as TEHGDA concentration increases from 1 to 50 mM for Ce and Nd (lanthanides) and Am (actinide) by a factor of 10. The D value for Eu increased by only a factor of 2 over the same range. As shown in FIG. 11, the Separation Factor decreased slightly over increasing TEHDGA concentration, while still maintaining at a level greater than 25.

Figure 12:
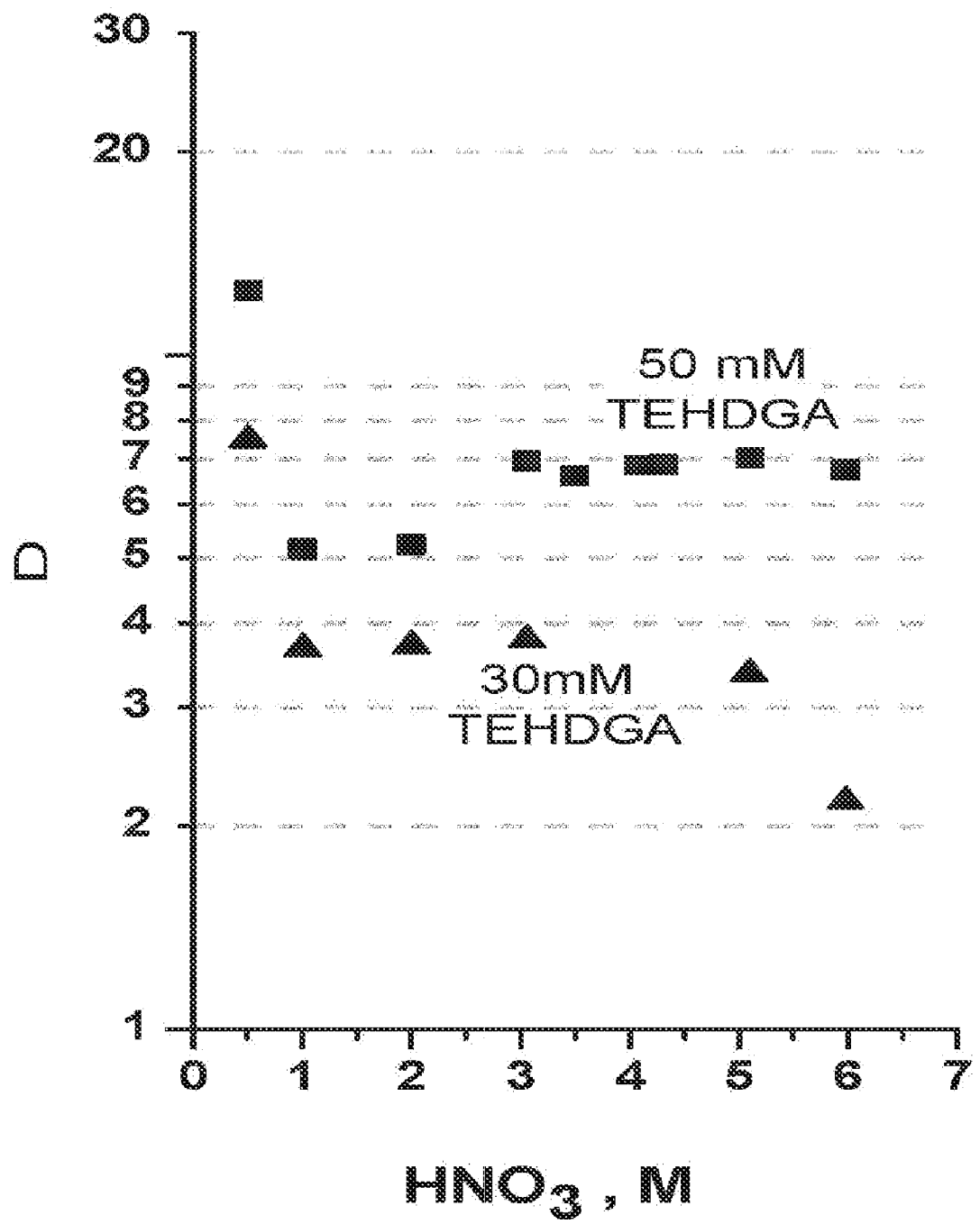
FIG. 12 is a graph of the Distribution ratio for La-140 verses Nitric Acid for 30 mM TEHDGA and 50 mM TEHDGA concentration.
Figure 13:
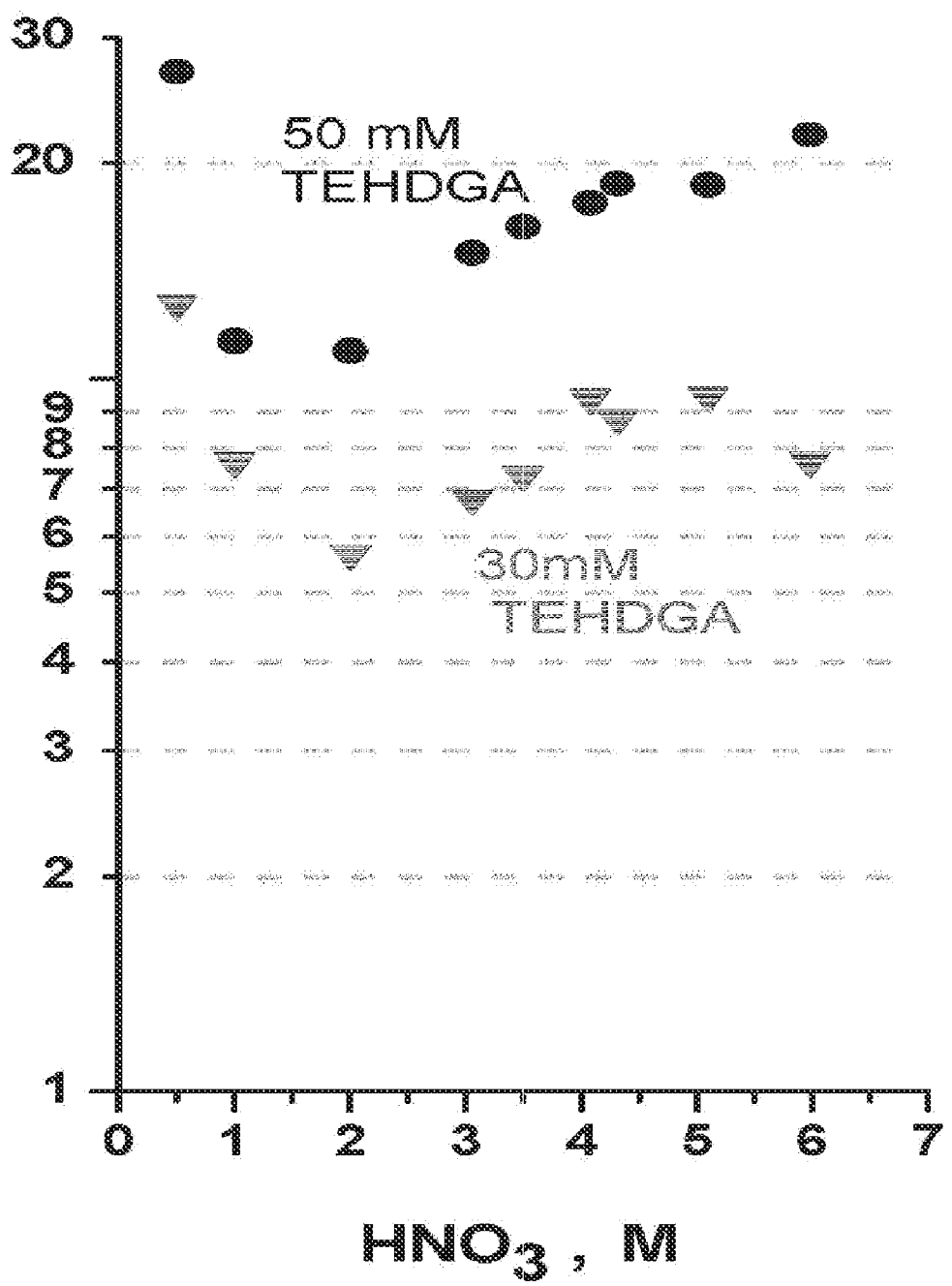
FIG. 13 is a graph of the Distribution ratio for Ce-141 verses Nitric Acid for 30 mM TEHDGA and 50 mM TEHDGA concentration.

FIGS. 12 and 13 illustrate the change in the Distribution factor for two lanthanides for varying nitric acid concentration. Lanthanum appears to have the lowest D values among the lanthanides, in 3-5 M nitric acid. D values are 3.5 and 7 for 30 and 50 mM TEHDGA, respectively. As shown by FIG. 13, the D values for cerium range from 9-21 and 5.5-9 for 30 and 50 mM TEHDGA, respectively.

Figure 14:
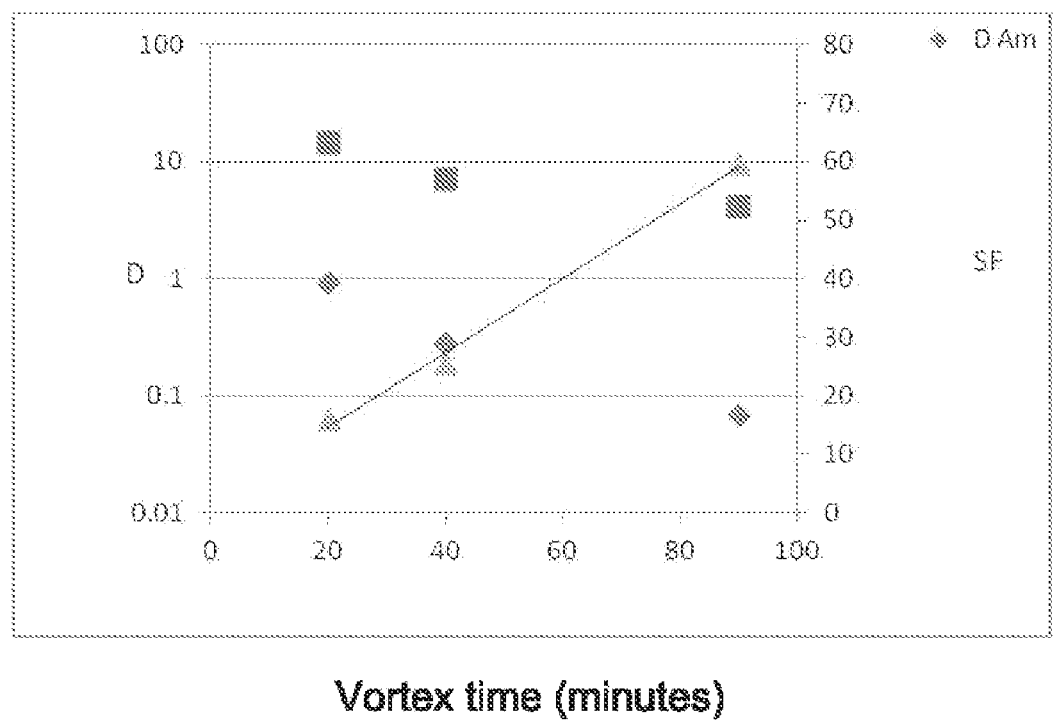
FIG. 14 is a graph of Distribution ratio and Separation Factor vs Vortex time for Americium and Euporium.

Further, as shown by FIG. 14, the inventor has discovered a separation process using a unique combination of extractants resulting in improved separation of minor actinides, Am and Cm from PUREX raffinate under typical operating conditions. The combination of a first extractant HDEHP or HEH[EHP] and a second extractant TEHDGA or TOGDA, as shown in FIG. 3 provides improved Distribution ratio (Calculated as Concentration of Am in organic/Concentration of Am in the aqueous phase) over a wide range of nitric acid inverse molarity. As shown in FIG. 14 the Distribution ratio (D value) for americium decreases from approximately 0.9 to 0.0700 for a range of vortex times from 20 to about 90 minutes. Further, the D value for Europium decreases from about 15 to about 4 over the same range. This results in a range of Separation factors 16 to about 60.

Process Equipment

The process 10 of this invention can be performed using a number of different pieces of process equipment. The aqueous feed stream 12 can be introduced adjacent the top of a packed countercurrent column 14, while the solvent 16 and extractants are introduced adjacent to the bottom of the column. The aqueous raffinate 18 is withdrawn from the bottom of the column while the organic solvent, actinides and lanthanides are withdrawn adjacent to the top of the column. The scrubbing solutions, as needed, are introduced near the top of the column. The stripping steps may be performed near the top of the column or in separated processing vessels. In an embodiment, the process could be performed in centrifugal contactors, mixer-settlers or pulsed columns. Alternatively, the extraction, scrubbing and stripping steps may be performed in a pulsed column. As an additional alternative, centrifugal contactors may be used for the extraction, scrubbing and separation. The size of the column or number of contactors can be adjusted based on the volume and composition of the feed stream. This process can be carried out using mixer-settlers as well.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The embodiment of the invention in which an exclusive property or privilege is claimed is defined as follows:

1. A process for separating minor actinides from lanthanides in the reprocessing of a spent nuclear fuel comprising
   providing a fluid mixture comprising, a trace amount of fission products, lanthanides, minor actinides, rare earth elements, nitric acid and water;
   adding at least one first organic complexing agent to the fluid mixture;
   extracting the fluid mixture with a solvent comprising a mixture a first extractant, a second extractant and an organic diluent to form a first organic extractant stream and a first aqueous raffinate comprising fission products,
   performing at least a first scrubbing step on the first organic extractant stream with a mixture of dicarboxylic acid and a first chelating agent to form a first scrubber discharge;
   in a first stripping step, stripping the scrubber discharge with a buffer and a second chelating agent in the pH range of from about 2.5 to about 6.1 to produce an actinide and lanthanide stream and a spent organic diluent, where the first extractant is selected from the group consisting of bis(2-ethylhexyl)hydrogen phosphate (HDEHP) and mono(2-ethylhexyl)-2-ethylhexyl phosphonate (HEH(EHP)) and the second extractant is selected from the group consisting of N,N,N,N-tetra-2-ethylhexyl diglycol amide (TEHDGA) and N,N,N',N'-tetraoctyl-3-oxapentanediamide (TODGA).

2. The process according to claim 1, wherein the minor actinides are selected from the group consisting of americium and curium.

3. The process of claim 2, wherein the dicarboxylic acid in the first scrubbing step is oxalic acid.

4. The process of claim 2, wherein the process further comprises a second scrubbing step following the first scrubber discharge wherein the first scrubber discharge is further scrubbed with a carboxylic acid.

5. The process of claim 4, wherein the process further comprises a second stripping step wherein a third chelating agent is added and the pH is adjusted from about 4.5 to about 5.5.

6. The process of claim 5, wherein the first stripping step is performed at a pH range of from about 2.5 to about 4.5 and provides a first product stream comprising minor actinides and the second stripping step is performed at a pH of from about 4.5 to about 5.5 to provide a second stream comprising lanthanides.

7. The process according to claim 1, wherein the concentration of TEHDGA is from about 0.5 mM to about 200 mM.

8. The process of claim 1, wherein the first organic complexing agent is N-hydroxyethyl-ethylenediamine-triacetic acid (HEDTA).

9. The process of claim 8, wherein oxalic acid is added with HEDTA to the fluid mixture prior to extraction.

10. The process according to claim 1, wherein the fission products are selected from the group consisting of uranium, plutonium and neptunium.

11. The process of claim 1, wherein the second chelating agent is selected from the group consisting of diethylene triamine pentaacetic acid (DTPA) and N-hydroxyethyl-ethylenediamine-triacetic acid (HEDTA).

12. The process according to claim 11, wherein the second chelating agent is DTPA and the actinides are stripped at a DTPA concentration of from about 1 mM to about 100 mM.

13. The process of claim 4 wherein the carboxylic acid is selected from the group consisting of formic acid, lactic acid and citric acid.

14. The process of claim 1, wherein the buffer is a mixture of ammonia and a carboxylic acid wherein said carboxylic acid is citric acid, lactic acid or a combination thereof.

15. The process of claim 13, wherein the carboxylic acid is citric acid.

16. The process of claim 14, wherein the second chelating agent is DTPA and the buffer is ammonia citrate.

17. The process of claim 1, wherein the first extractant is bis(2-ethylhexyl)hydrogen phosphate (HDEHP) and the second extractant is N,N,N,N-tetra-2-ethylhexyl diglycol amide (TEHDGA).

18. The process of claim 1, wherein the first extractant is mono(2-ethylhexyl)-2-ethylhexyl phosphonate (HEH(EHP)) and the second extractant is N,N,N,N-tetra-2-ethylhexyl diglycol amide (TEHDGA).

19. The process of claim 1, wherein the first extractant is mono(2-ethylhexyl)-2-ethylhexyl phosphonate (HEH(EHP)) and the second extractant is N,N,N',N'-tetraoctyl-3-oxapentanediamide (TODGA).

* * * * *